United States Patent [19]

Smith

[11] Patent Number: 5,261,433

[45] Date of Patent: Nov. 16, 1993

US005261433A

[54] WHEEL CLEANER

[75] Inventor: Thomas J. Smith, Altrincham, United Kingdom

[73] Assignee: Wheelwash Limited, Hale, United Kingdom

[21] Appl. No.: 911,910

[22] Filed: Jul. 10, 1992

[51] Int. Cl.⁵ ............................................. B60S 3/04
[52] U.S. Cl. ................................................. 134/123
[58] Field of Search ............ 134/45, 123; 15/DIG. 2, 15/53.3, 53.4

[56] References Cited

U.S. PATENT DOCUMENTS 1,651,045 11/1927 Smith ................................. 134/123
1,694,197 12/1928 Woodling ........................... 134/45
4,917,125 4/1990 Midkiff .............................. 134/123

FOREIGN PATENT DOCUMENTS 172858 10/1982 Japan ................................. 134/123
2147859 5/1985 United Kingdom ................ 15/53.4
2239848 7/1991 United Kingdom ................ 134/45

Primary Examiner—Philip R. Coe
Attorney, Agent, or Firm—Antonio R. Durando; Harry M. Weiss

[57] ABSTRACT

Equipment for cleaning the wheels of a vehicle comprises means over which the vehicle can be driven to cause the wheels to be raised from the ground on a ramp, lowered into a water bath, raised from the water bath and lowered to the ground again as the vehicle is driven thereover. In an alternative embodiment a frame supporting nozzles is provided under which frame a vehicle is able to be driven. Clensing liquid passes through the nozzles and washes the top and sides of the vehicle.

11 Claims, 5 Drawing Sheets

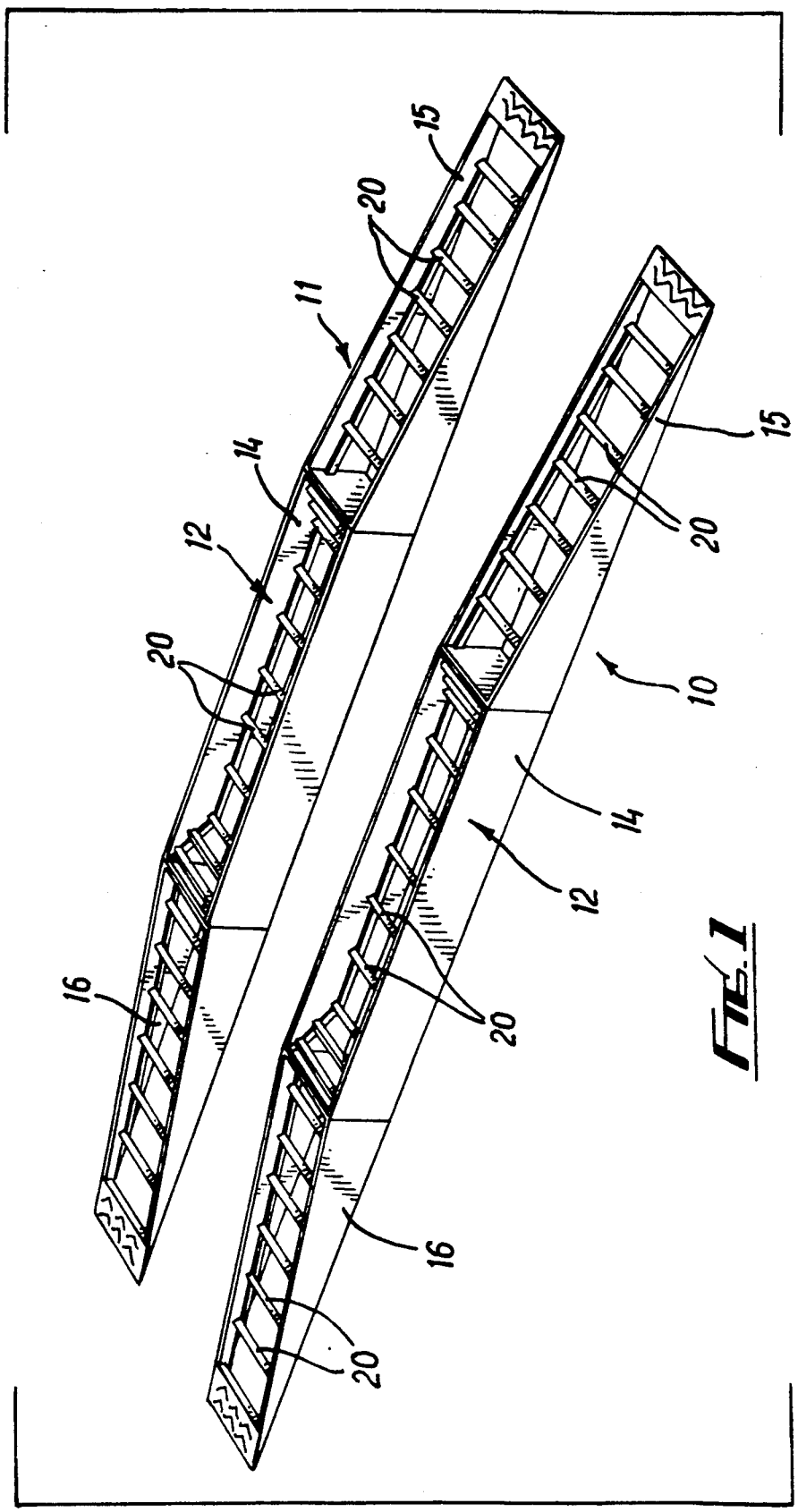

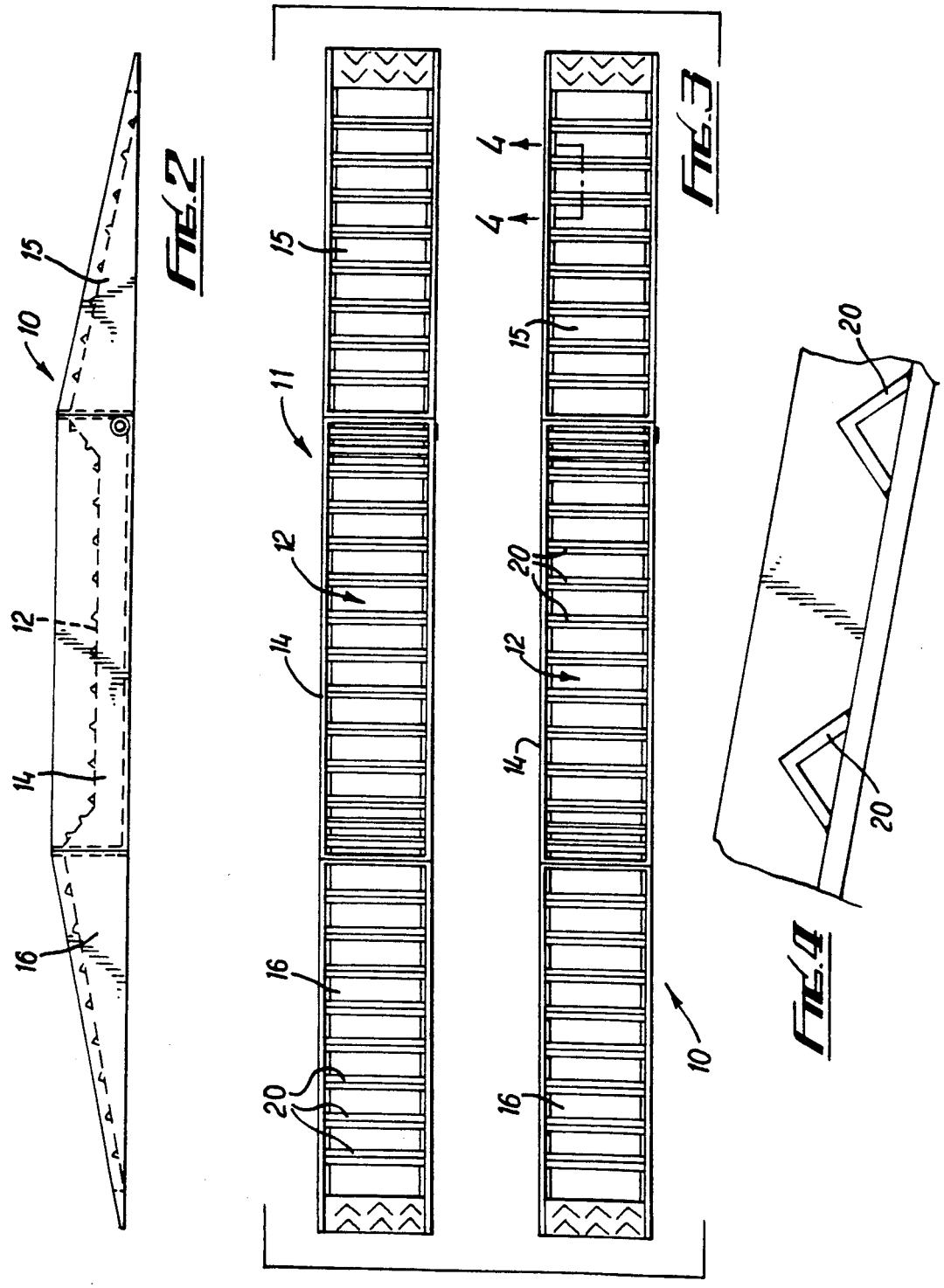

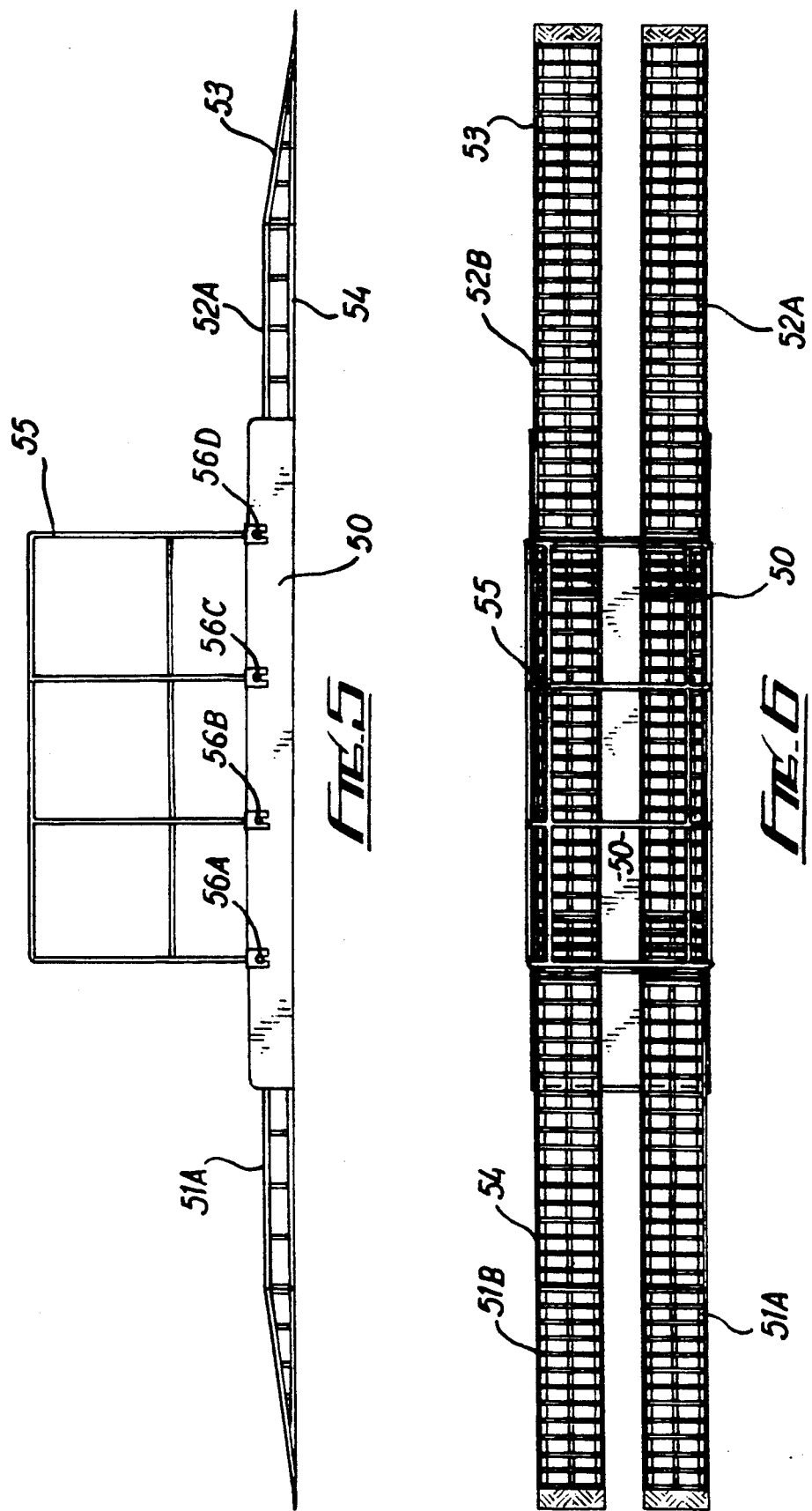

WHEEL CLEANER

BACKGROUND OF THE INVENTION

This invention relates to equipment for cleaning the wheels of vehicles particularly, though by no means exclusively, intended for installation at the exit from a construction site.

Construction sites, especially during early stages of operations, when topsoil is being removed can become very muddy. Before the site is levelled or otherwise contoured, foundations dug and drains and other services are laid, extensive amount of mud may be present, except possibly after extended drought. Vehicles leaving such sites inevitably have considerable quantities of mud adhering to their wheels and despite some precautions much of this is deposited on public highways, mainly in the vicinity of a site entrance.

In certain states a site operator may be responsible for keeping the highway clean and may be obliged to deploy considerable resources to this task.

BRIEF SUMMARY OF THE INVENTION

It is an object of the present invention to provide equipment for cleaning the vehicles and in particular vehicles' wheels, suitable for easy and quick installation at the exit from a construction site thus considerably reducing the aforesaid problem. In particular it is an aim that the equipment is easily transportable and easily and quickly erected.

According to a first aspect of the present invention there is provided equipment for cleaning the wheels of a vehicle comprising means over which the vehicle can be driven to cause the wheels to be raised from the ground, lowered into a water bath, raised from the water bath and lowered to the ground again as the vehicle is driven thereover.

The means may comprise laterally spaced longitudinally extending tracks each having a central portion located within the water bath and between ramp portions, which ramp portions extend from its opposite ends to the ground.

Each track may be comprised by a plurality of transversely extending longitudinally spaced bars.

The bars may have a cross-section defining an upwardly directed ridge. They may be formed from lengths of angle iron.

The spacing between the bars may be such as to repeatedly jolt the wheels as they are driven thereover.

The water bath may be provided with a drain hole for draining water so that the bath may be cleaned of accumulated mud and slurry.

According to a second aspect of the present invention, there is provided a shower assembly for dispensing a cleansing liquid, supported by a support frame such that a vehicle may pass under the said shower assembly thereby permitting said cleansing liquid to be sprayed onto at least a portion of the vehicle.

Preferably the liquid is water and a reservoir of the liquid is positioned close to the shower assembly. The assembly may be gravity fed or pumping means may be provided for urging the liquid through the shower assembly. Spray heads may be positioned so that jets of liquid wash the side(s) of vehicles and wheels of vehicles.

Side plates, for preventing spillage and splashing of water from the water bath may be fitted. Similarly a suitably adapted filter may be arranged to receive liquid from the water bath, filter it and return this to the reservoir.

Anti-splash boards may be fitted to the water bath to prevent water spilling over the edge in the event that waves form. Of course grids may be provided, below the waterline, to break-up waves and prevent larger waves from forming.

The invention will be further apparent from the following description, with reference to the accompanying drawings, which show, by way of example only, two forms of equipment embodying different aspect of the invention.

BRIEF DESCRIPTION OF THE DRAWINGS

FIG. 1 is a perspective view of the equipment;

FIG. 2 is a side elevation of the equipment of FIG. 1;

FIG. 4 is a fragmentary cross-section on the line IV—IV of FIG. 3;

FIG. 5 is a side elevational view of an alternative embodiment of the invention showing water bath and shower assembly;

FIG. 6 is a plan view of the embodiment of FIG. 5;

FIG. 9 is a perspective view of a truck driving under the shower and through the water bath.

DETAILED DESCRIPTION OF THE PREFERRED EMBODIMENTS

Figure 7:
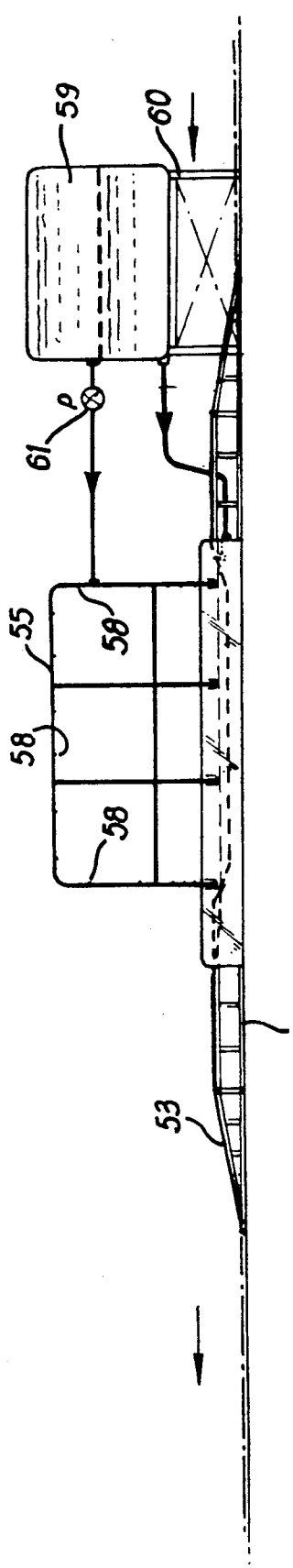
FIG. 7 shows the arrangement of FIG. 5 with a water reservoir tank.

Referring now to the drawings, it will be seen that the equipment comprises a pair of laterally spaced longitudinally extending tracks 10 and 11.

Each track has a central portion 12 of dish-profile when viewed from the side and located within an elongated water bath 14. Each of the tracks also has ramp portions 15 and 16 on either side of the central portion 12 and leading from the opposite upper ends thereof to the ground.

Each of the parts 12, 15 and 16 of each of the tracks is separate. Thus the central portions 12 may be lifted from the water baths 14 to facilitate cleaning of the baths by their removal if necessary. Again, the ramp portions 15 and 16 may be slid aside or turned onto their sides to enable the ground therebeneath to be cleared.

Each track has an overall length of 9 m or so divided equally between the parts 12, 15 and 16.

Each part of each of the tracks is comprised by a plurality of transversely extending longitudinally spaced bars 20 extending between side frame members. The bars 20 are formed from length of angle-iron so as to have upwardly directed ridges.

In use a vehicle with mud adhering to its wheels is driven over the equipment so that all of its wheels pass along the tracks 10 and 11. On the ramps 15 the bars penetrate the mud on the vehicle tires breaking it into smaller volumes. The spacing between the bars 20 is such that the wheels are repeatedly jolted as they pass over the tracks thus dislodging the volumes of mud to fall to the ground through the spaces between the bars 20. The tires then pass through the water baths 14 to be washed and then over the ramps 16 where the water drains from the tires and further residual mud can be released again by penetration and the jolting action.

It will be appreciated that it is not intended to limit the invention to the above example only, many variations, such as might readily occur to one skilled in the art, being possible, without departing from the scope thereof.

The exit end of the water bath may be provided with baffle means to reduce expulsion of water surging forwardly in the bath.

The water bath may incorporate flexible diaphragms whose displacement by the weight of a passing vehicle causes water to be displaced and directed in jets at the sides of the vehicle wheels.

Again, the bath may be equipped with brush means which engage wheels as they pass through the bath.

There may be a single water bath extending over the entire width of the equipment with the advantage of increased capacity.

The means over which the vehicle is driven may also extend over the full width of the equipment, making alignment of the vehicle with the apparatus less critical.

One or more frames in the form of hoops and carrying water spray nozzles may be provided along the length of the equipment to wash the top and sides of the vehicle as it is driven therethrough along the length of the equipment. An embodiment incorporating this feature is shown in FIGS. 5-9. If such equipment is intended for decontamination of a vehicle the means over which the vehicle is driven in the water bath may be located above the water level.

Brief description of the embodiment shown in FIGS. 5 to 9 inclusive will now be made.

A single water bath 50 has a pair of ramps 51A and 51B and 52A and 52B extending from each end. The ramps 51 and 52 comprise slanting portions 53 and relatively flat portions 54. It is of course possible to place several flat portions 54 adjacent one another, so that a vehicle may pass across a relatively muddy region of ground, without collecting any mud, once its tires have been washed. Such extended raised track portions may be used when the water bath is positioned some distance away from a site or factory exit.

A frame 55 is mounted on the water bath 50 by bolts 56A, 56B, 56C and 56D. The frame is hollow and is fitted with a plurality of nozzles 58. Water, or whatever other cleaning liquid to be used, is fed into the frame and is squirted through the nozzles 58 which are formed intermittently around the frame 55.

FIG. 7 shows a water tank 59 positioned on a stand 60. The tank is positioned adjacent the water bath 50. A pump 61 pressurises water from the tank and pumps the water into the hollow tube of the frame 55. FIG. 9 shows a truck 63 passing underneath a shower of sprays.

Figure 8:
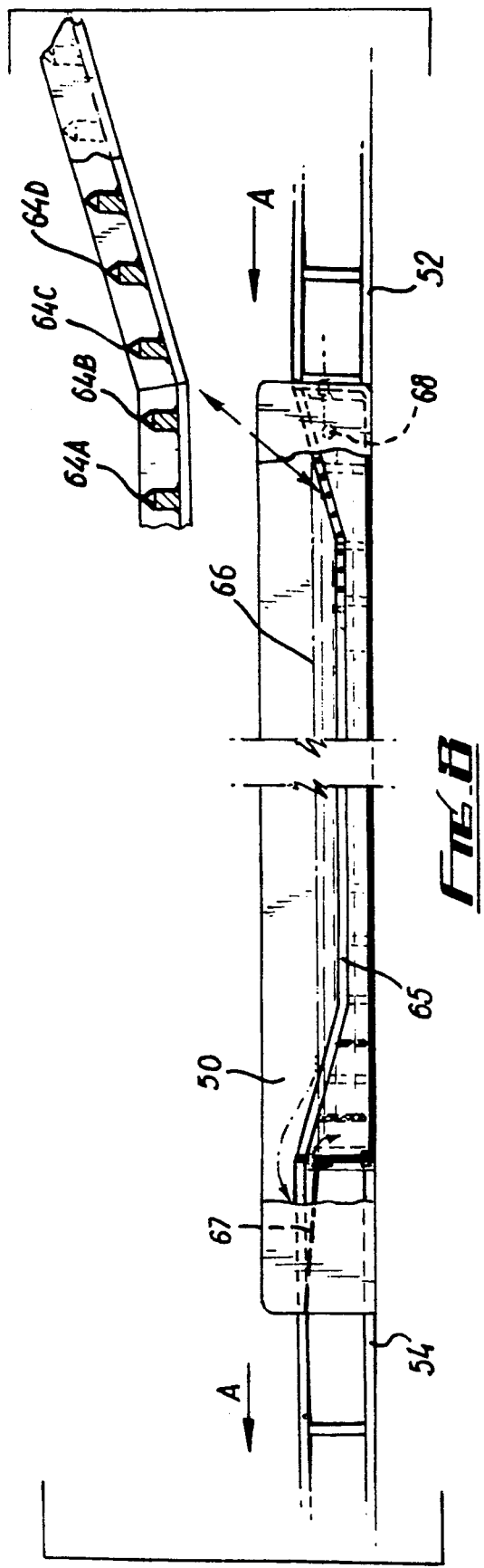
FIG. 8 is a side elevational, part fragmentary detailed view of part of the water bath.
Figure 3:
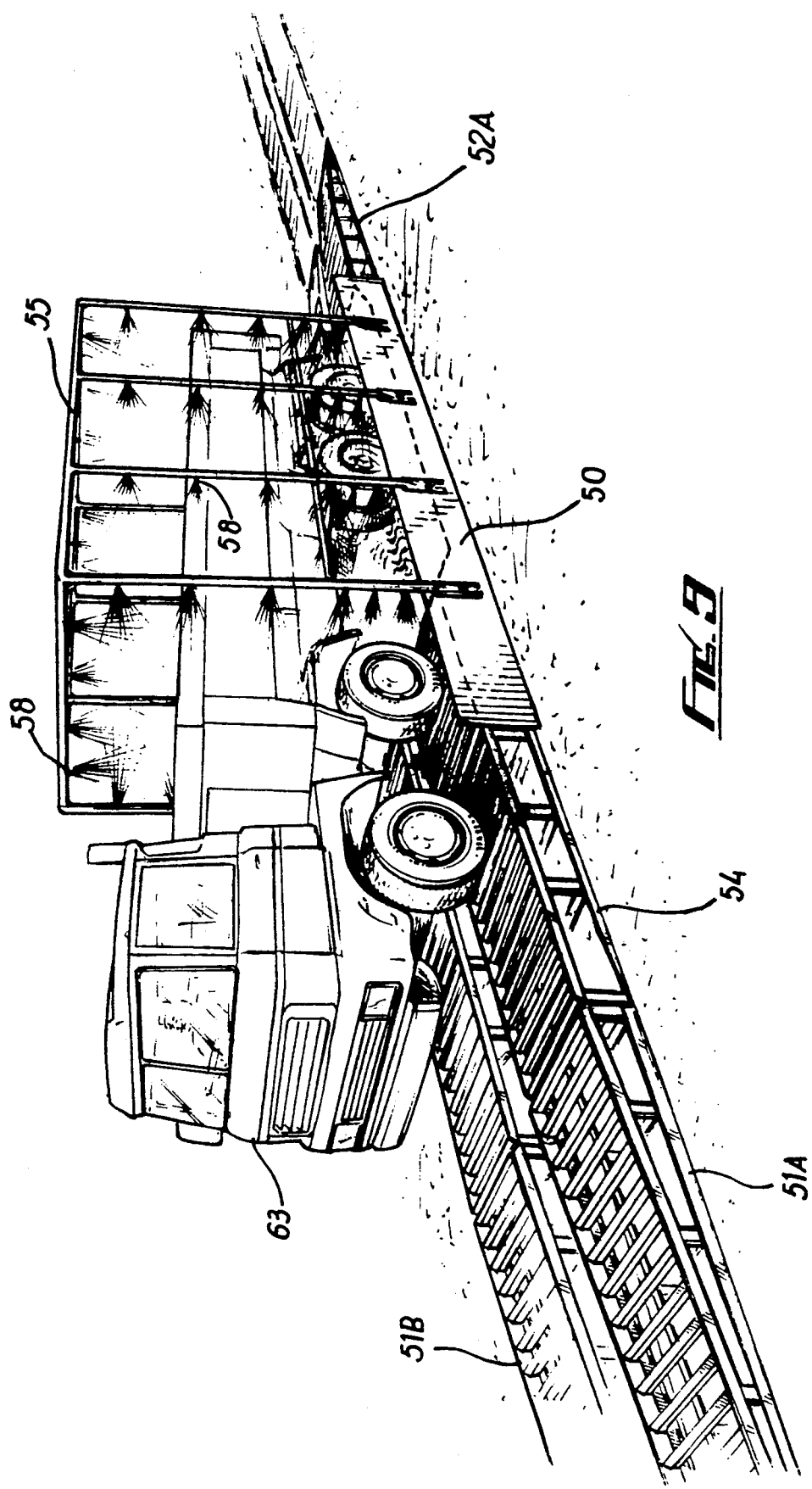
FIG. 3 is a plan view of the equipment of FIG. 1.

FIG. 8 and the enlarged portion thereof (shown as an inset) show the water bath 50 in detail. The arrows A show the direction of travel of a vehicle. Angled struts 64A, 64B, 64C, 64D etc. are supported on assembly frame 65. The water's level is shown at 66. A splash tray 67 is positioned at the exit and so as to prevent water from spilling over the rim of the bath. An orifice 68 drains water from the bath 50 to a tank (not shown). The orifice 68 is positioned just below the water level 66 so as to prevent the ingress of mud. A filter (not shown) may be included between the bath and the tank as an optional feature.

The level of water in the bath may be controlled automatically, for example by a ballcock (not shown) or similar automatic valve which opens when the water level 66 drops below a predetermined limit.

It will be appreciated that variations to the above mentioned embodiments may be made without departing from the scope of the invention. For example instead of water a suitable decontaminant agent could be used to wash a vehicle if for example it was transporting radioactive ore or toxic chemicals. The water bath could collect the waste decontaminant, and a pump could pump it to a separate storage tank for ultimate disposal. Thus it will be appreciated that the system may be used at exits to factories/sites where hazardous chemicals are manufactured or stored as a final safety measure before a container drives onto a public highway.

I claim:

1. Equipment for cleaning the wheels of a vehicle comprising:

ramp means over which the vehicle can be driven for raising the wheels of the vehicle from the ground;

means for lowering the wheels of the vehicle into a water bath and for raising the wheels from the water bath; and ramp means for lowering the wheels to the ground again as the vehicle is driven over the equipment;

wherein said means for lowering and raising the wheels of the vehicle into and from the water bath consists of a removable section immersed in water at a predetermined level and comprising a plurality of transverse, longitudinally-spaced bars placed below said predetermined water level.

2. Equipment according to claim 1, wherein all of said means consist of two laterally-spaced longitudinally-extending tracks, each track having a central portion located within the water bath and having two ramp portions extending from opposite ends of said central portion to the ground.

3. Equipment according to claim 2, wherein each track is comprised by a plurality of transversely extending longitudinally spaced bars.

4. Equipment according to claim 3, wherein the bars have a cross-section defining an upwardly directed ridge.

5. Equipment according to claim 4, wherein the bars are comprised by lengths of angle iron.

6. Equipment according to claim 3, wherein the spacing between the bars is such as to repeatedly jolt the wheels as they are driven thereover.

7. Equipment according to claim 2, wherein the spacing between the bars is such as to repeatedly jolt the wheels as they are driven thereover.

8. Equipment according to claim 1, wherein said means for lowering the wheels into and for raising the wheels from the water bath has a predetermined width and wherein said water bath extends over the entire width of said means for lowering the wheels into and for raising the wheels from the water bath.

9. Equipment according to claim 1, wherein the water bath is provided with a drain hole.

10. Equipment according to claim 1, further including at least one frame carrying spray nozzles to wash the vehicle as it is driven through the equipment.

11. Equipment according to claim 1, wherein the spacing between the bars is such as to repeatedly jolt the wheels as they are driven thereover.

* * * * *